Patented May 11, 1954

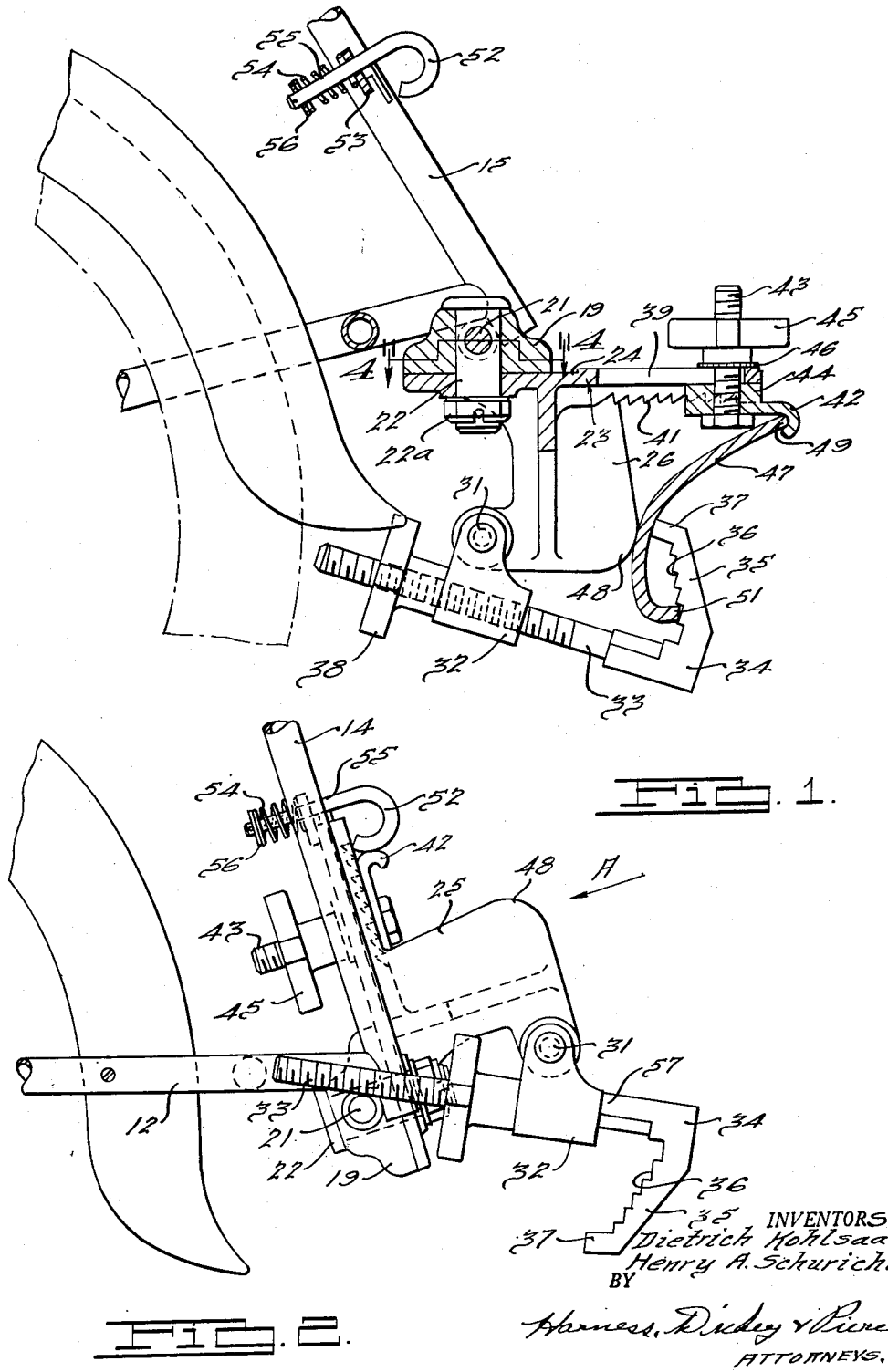

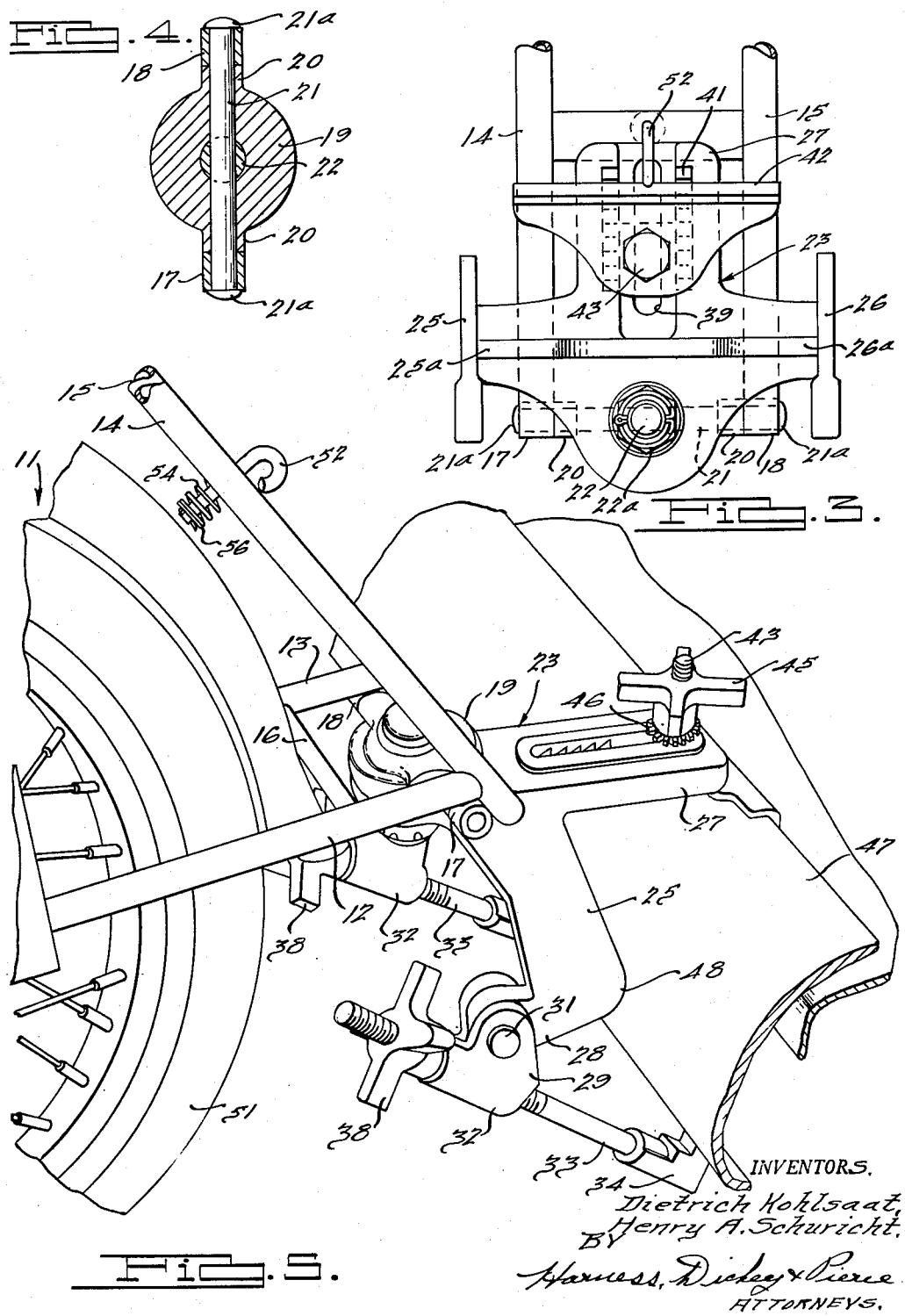

2,678,221

UNITED STATES PATENT OFFICE 2,678,221

BUMPER ATTACHED HITCH FOR TOWING BICYCLES OR THE LIKE

Dietrich Kohlsaat, Bloomfield Hills, and Henry A. Schuricht, Pontiac, Mich., assignors to Whizzer Motor Company, Pontiac, Mich., a corporation of Delaware Application October 17, 1950, Serial No. 190,474

6 Claims. (Cl. 280—292)

This invention relates to towing hitches and more particularly to a hitch mechanism adapted to couple a bicycle, motorcycle, or the like, to the rear end of an automotive or other towing vehicle.

It is an object of the present invention to provide a hitch mechanism for quickly and easily attaching a bicycle, motorcycle, or the like, to the rear bumper or similar part of an automotive vehicle so that the motorcycle may be conveniently towed by the vehicle without danger of detachment or of damage to the motorcycle or the vehicle. More particularly, it is within the contemplation of this invention to provide such a hitch which will hold the motorcycle in partially lifted upright position and in proper relation to the towing vehicle at all times, and will absorb variations in movement due to uneven road conditions, turning of the vehicle and other disturbing forces.

It is another object of this invention to provide a hitch as described which can be quickly moved to a retracted or stored position on the motorcycle when not in use, and which may be easily and permanently installed on a motorcycle using standard parts thereof.

It is also an object to provide a hitch for a motorcycle or the like which is extremely compact in design, and which has a universal connection to the motorcycle occupying a minimum of space.

It is a further object to provide a hitch as described which can be adjusted for various sizes and shapes of vehicle bumpers and may be firmly secured to the bumper by a simple manipulation without the use of tools or special appliances.

Other objects, features and advantages of the present invention will become apparent from the subsequent description and drawing of the device.

In the drawings,

Figure 1 is a side view, partly in cross-section, of the hitch in attached position on the bumper of an automotive vehicle;

Fig. 2 is a side view of the hitch in its folded or retracted position;

Fig. 3 is a rear view of the hitch in its retracted position, looking in the direction of the arrow A at Fig. 2;

Fig. 4 is a cross-sectional view taken along the line 4—4 of Fig. 1 and showing the structural details of the pivot assembly; and Fig. 5 is a perspective view of the hitch in its attached position.

The hitch is designed to be installed at one end of a motorcycle 11 or similar multi-wheeled vehicle and is shown in the present instance as being pivotally mounted between parallel frame members 12 and 13 at the rear end of the motorcycle. These frame members may form part of the vehicle frame or may be used as support members for a vehicle accessory such as a baggage rack or the like. Braces 14 and 15 are connected to the ends of members 12 and 13 respectively and extend upwardly, being inclined toward the forward end of the motorcycle, the upper ends of these braces being connected to the baggage rack (not shown) or similar accessory. Members 12 and 13 are provided with a transverse strut 16 and the outer ends of these members at their juncture with braces 14 and 15 have a pair of spaced bearings 17 and 18 depending therefrom, aligned transversely to the motorcycle.

Pivotally mounted between bearings 17 and 18 is a pivot plate 19. This plate has a pair of oppositely disposed bearing portions 20 in flush alignment with bearings 17 and 18, and a pivot pin 21 extends through these bearings, thus supporting the pivot plate 19 for pivotal movement about an axis transverse to the motorcycle. Pin 21 may be peened at its ends 21a to retain the pin within the bearings. A vertical swivel pin 22 extends concentrically through pivot plate 19 and a bracket 23 is connected for swiveling movement to pivot plate 19 by means of this swivel pin. It will be noted, particularly from Fig. 4, that pivot pin 21 is of smaller diameter than swivel pin 22, and that the latter pin has a transverse aperture (not designated) through which pin 21 extends, thus resulting in a compact arrangement of parts. The undersurface of pivot plate 19 is of flat shape and is in flush relation with a flat bearing surface 24 at the rear end of bracket 23, the swivel pin 22 extending through aligned bearing holes (not designated) in the pivot plate and bracket. A lock nut 22a retains pin 22 in position. It will thus be seen that the pivot plate 19 and its associated parts constitute a universal joint between bracket 23 and the frame of the motorcycle in that pivot pin 21 will allow movement about an axis which is transverse to the plane of the cycle and swivel pin 22 movement about an axis normal to that of pin 21. However, opposite ends of the swivel pin, including lock nut 22a, prevent relative movement between bracket 23 and pivot plate 19 in the direction of the swivel axis, that is, vertically in Figure 1.

Bracket 23 is designed to support the gripping elements of the hitch, and for this purpose the bracket has a pair of downwardly diverging arms 25 and 26 and an extension or platform 27. Arms 25 and 26, which are provided with strengthening ribs 25a, 26a, are of generally bell-crank shape and are each provided with an angular extension 28 at its outer end. A yoke 29 is pivoted to each extension 28 by means of a pin 31, and these yokes are provided with apertured guide portions 32 outwardly spaced from the pivot pins 31. An externally threaded clamping rod 33 is slidably mounted within each guide portion 32 and has secured at the outer end thereof a grip 34. This grip has a contacting finger 35 extending substantially transversely to clamping rod 33, and this finger is provided with a series of parallel steps 36 at progressively increasing distances from the rod and at progressively shorter distances from its supporting yoke 29. The outer end of finger 35 is provided with an extension 37 for purposes to be hereinafter described. A clamping handle 38 is threadably mounted on rod 33 on the opposite side of yoke 29. It will be seen, therefore, that upon proper rotation of handle 38 the rod 33 will be drawn through the guide portion 32 of yoke 29, thus drawing finger 35 toward bracket 23.

Platform 27 extends in substantial alignment with bearing surface 24 beyond the arms 25 and 26, and this platform is provided with an elongated slot 39 closed at both ends and two rows of serrations 41 on the underside of the platform and outwardly adjacent slot 39. The purpose of slot 39 and serrations 41 is to adjustably lock and support an upper grip 42. For this purpose a threaded pin 43 extends through slot 39, the lower end of pin 43 supporting a serrated base portion 44 of grip 42. The serrations (not designated) on base portion 44 are designed to interfit in locking relation with selected serrations 41 on platform 27, and it will be observed, particularly from Fig. 1, that the shape of the serrations are such as to resist forces tending to pull the grip 42 to the outer end of the platform. A clamping handle 45 is threadably mounted on pin 43 above platform 27, and a lockwasher 46 may be provided between the handle and the slotted platform. It will be seen therefore that upon proper loosening and then tightening of handle 45 the hook 42 may be preset longitudinally of platform 27 so as to accommodate any particular size or shape of bumper or similar object to which the hitch is to be attached.

The operation of the hitch may perhaps best be shown by a description of the steps in attaching the hitch to the bumper 47 of an automotive vehicle. The grip 42 is preset and locked in such position that when the corners 48 of the arms 25, 26 are resting against the bumper and the grip 42 is engaged to the upper edge 49 of the bumper, the platform 27 and bearing surface 24 of the bracket 23 will be in a substantially horizontal position. Since when the motorcycle is resting on the ground bearings 17 and 18 would be lower than the bumper of an ordinary motor vehicle, this adjustment will result in the rear wheel 51 of the motorcycle being raised from the ground. The two clamping rods 33 are next extended from their respective guide supports 32 a sufficient distance to allow fingers 35 to be engaged under the bumper. The fingers 35 are then adjusted so as to allow the lower edge 51 of the bumper to be engaged by one of steps 36, the choice being such that extension 37 will simultaneously engage the intermediate portion of the bumper. The clamping handles 38 are next tightened so as to draw the fingers 35 toward arms 25. When this is done it will be seen that the bumper will be firmly gripped between the corners 48 of arms 25 and the fingers 35. Due to the bell crank shape of arms 25, subsequent tightening of handles 38 will cause these arms to tend to rotate counterclockwise as seen in Fig. 1, pivoting about corners 48. This action will cause a slight leftward movement of platform 27 and due to the action of serrations 41 this movement will cause grip 42 to engage more tightly the upper edge 49 of the bumper. It will thus be observed that merely by tightening handles 38 both the upper and the lower gripping elements of the hitch will be actuated, and the bumper firmly gripped by engagement of the edges in one direction and of the intermediate section in the opposite direction.

While the motorcycle is being towed, the universal joint action of pivot plate 19 previously described will allow the motorcycle to pivot both vertically and horizontally with respect to the towing vehicle. In particular, an upward or downward movement of the towing vehicle due to road unevenness or other obstruction will cause the motorcycle frame to pivot about pivot pin 21. Furthermore, a turning movement of the towing vehicle will result in the motorcycle swivelling about pin 22 while still being held in its upright position. Since the rear wheel of the motorcycle is held in raised position, the tractive force necessary to tow the cycle will be lessened, and the front wheel of the cycle (not shown) will be in rolling contact with the ground. The front wheel is preferably locked in its center position when the cycle is towed, so as to prevent uncontrolled swinging about its own swivel axis, and the cycle will therefore turn only at plate 19. It will be noted particularly that pivot pin 21 and swivel pin 22 will perform their functions simultaneously, and that the extremely compact construction afforded by the passage of pin 21 through pin 22 will not interfere in any way with the operation.

Means are provided for retracting the hitch into a folded position when not in use. For this purpose a hook or latch 52 is mounted between braces 14 and 15 by means of a transverse bracket 53. A coil spring 54 surrounds the shank 55 of hook 52 and has one end supported by bracket 53, the other end of the spring resting against washer 56 secured to the shank and thus urging the hook into a retracted position. When it is desired to unhitch the motorcycle, handles 38 are rotated allowing fingers 35 and hook 42 to be disengaged from the bumper. Handle 45 is then rotated to loosen the grip 42 which is slid into a retracted position at the inner end of slot 39 and locked in this position. The entire bracket 23 and its associated parts are then swung upwardly about pivot pin 21, as seen in Figs. 2 and 3. Hook 52 is manually pulled out and the outer end of platform 27 is placed under the hook. It will thus be seen that spring 54 will hold hook 52 against platform 27, and since the outer end of the platform will rest against bracket 53 the entire assembly will be held in a retracted position. The handles 38 may be rotated so as to withdraw clamping rods 33 and grips 34 to a retracted position as shown in Fig. 2, with the inner ends 57 of the grips abutting guide members 32.

While it will be apparent that the preferred embodiment of the invention herein disclosed is well calculated to fulfill the objects above stated, it will be appreciated that the invention is susceptible to modification, variation and change

What is claimed is:

1. In a hitch for towing a motorcycle or the like in partially raised position, a pair of laterally spaced frame members on said motorcycle, a pair of aligned bearings on said frame members, a pivot plate disposed between said bearings, pivot means on a central portion of said plate and supported by said bearings, a bracket pivotally connected to said pivot plate for swivelling movement about an axis normal to said bearings, means for preventing relative movement of said bracket and pivot plate in the direction of the swivel axis, and a platform on said bracket having gripping means thereon adapted to engage a structural element on a towing vehicle, said bracket being movable about said first pivot between an operative position in which said platform extends outwardly from said frame members and a retracted position in which the platform is disposed substantially between said members.

2. The combination according to claim 1, further provided with latch means for holding said bracket in its retracted position, said latch means comprising a hook slidably mounted between said frame members and engageable with the outer end of said platform, and resilient means urging said hook into its engaged position.

3. In a hitch for towing a motorcycle or the like in partially raised position, a pair of laterally spaced frame members on said motorcycle, a pair of aligned bearings on said frame members, a pivot plate disposed between said bearings and pivotally supported thereby, a bracket pivotally connected to said pivot plate for swivelling movement about an axis normal to said bearings, means for preventing relative movement of said bracket and pivot plate in the direction of the swivel axis, and a platform on said bracket having gripping means thereon adapted to engage the upper edge of a structural element on a towing vehicle, a pair of spaced arms on said bracket engageable with an intermediate section of said structural element, lower gripping means adjustably mounted at the outer end of each of said arms and adapted to grip the lower edge of said structural element, and manual means for drawing said lower gripping means into engagement with said structural element against the action of said arms, whereby said bracket will simultaneously draw said upper gripping means into engagement with said structural element.

4. In a hitch for towing a motorcycle or the like in partially raised position, a pair of laterally spaced frame members on the motorcycle, a pair of bearings on said frame members aligned transversely to said motorcycle, a pivot plate disposed between said bearings, a pivot pin extending through said pivot plate and supported by said bearings, a swivel pin extending through said pivot plate normally to said pivot pin, said swivel pin being of larger diameter than said pivot pin and having a radial passage through which the pivot pin extends, gripping means pivotally attached to said swivel pin and adapted to engage a towing vehicle, and means on said swivel pin for preventing relative movement of said gripping means and pivot plate in the direction of the swivel axis.

5. In a hitch for towing a motorcycle or the like in partially raised position, a pair of laterally spaced frame members on the motorcycle, a pair of bearings on said frame members aligned transversely to said motorcycle, a pivot plate disposed between said bearings, a pivot pin extending through said pivot plate and supported by said bearings, a swivel pin extending through said pivot plate normally to said pivot pin, one of said pins being of larger diameter than the other of said pins and having a radial passage through which said other pin extends, gripping means pivotally attached to said swivel pin and adapted to engage a towing vehicle, and means on said swivel pin for preventing relative movement of said gripping means and pivot plate in the direction of the swivel axis.

6. In a hitch for towing in partially raised position a motorcycle or the like having laterally spaced frame members, a pivot plate, means carried by a central portion of said pivot plate for pivoting said plate between said frame members, a bracket pivotally connected to said pivot plate for swivelling movement about an axis normal to said first pivot, means for preventing relative movement of said bracket and pivot plate in the direction of the swivel axis, and a platform on said bracket having gripping means thereon adapted to engage a structural element on a towing vehicle, said bracket being movable about said first pivot between an operative position in which said platform extends outwardly from said frame members and a retracted position in which the platform is disposed substantially between said members.

References Cited in the file of this patent

UNITED STATES PATENTS

| Number | Name | Date |
|---|---|---|
| 1,949,962 | Hess | Mar. 6, 1934 |
| 2,280,734 | Tyler | Apr. 21, 1942 |
| 2,329,525 | Garrison | Sept. 14, 1943 |
| 2,448,436 | Jones | Aug. 31, 1948 |
| 2,468,894 | Peek | May 3, 1949 |
| 2,499,750 | Hotchkiss | Mar. 7, 1950 |

FOREIGN PATENTS

| Number | Country | Date |
|---|---|---|
| 14,880 | Great Britain | of 1903 |